United States Patent
Liu et al.

(10) Patent No.: US 10,922,680 B2
(45) Date of Patent: Feb. 16, 2021

(54) METHOD OF PROCESSING CARD NUMBER DATA AND DEVICE

(71) Applicant: CHINA UNIONPAY CO., LTD., Shanghai (CN)

(72) Inventors: Bin Liu, Shanghai (CN); Jianzhao Wu, Shanghai (CN); Yisheng Fu, Shanghai (CN); Guizhi Shi, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 265 days.

(21) Appl. No.: 16/067,246

(22) PCT Filed: Dec. 20, 2016

(86) PCT No.: PCT/CN2016/111143
§ 371 (c)(1),
(2) Date: Jun. 29, 2018

(87) PCT Pub. No.: WO2017/114243
PCT Pub. Date: Jul. 6, 2017

(65) Prior Publication Data
US 2019/0012658 A1    Jan. 10, 2019

(30) Foreign Application Priority Data
Dec. 29, 2015   (CN) .......................... 201511019374.9

(51) Int. Cl.
*G06Q 20/30* (2012.01)
*G06Q 20/34* (2012.01)
(Continued)

(52) U.S. Cl.
CPC ............. *G06Q 20/34* (2013.01); *G06F 16/00* (2019.01); *G06F 16/215* (2019.01);
(Continued)

(58) Field of Classification Search
CPC .................................. G06F 12/00; G06K 5/00
See application file for complete search history.

(56) References Cited

U.S. PATENT DOCUMENTS 6,575,361 B1 * 6/2003 Graves ................. G06Q 20/085
235/379
2003/0225742 A1 * 12/2003 Tenner ................... G06Q 30/02
(Continued)

FOREIGN PATENT DOCUMENTS

| CN | 102521704 A | 6/2012 |
| CN | 102630083 A | 8/2012 |
| CN | 105930331 A | 9/2016 |

OTHER PUBLICATIONS

International Search Report for corresponding Inter. App. No. PCT/CN2016/111143, dated Mar. 23, 2017.

*Primary Examiner* — Scott C Anderson
*Assistant Examiner* — Marla Hudson
(74) *Attorney, Agent, or Firm* — Renner, Otto, Boisselle & Sklar, LLP (57) ABSTRACT

A method of processing card number data and device including: determining, according to an expiration time corresponding to a card number, a table set corresponding to the card number, and including card number information corresponding to the card number into at least one card number storage table of the table set, wherein the table set comprises a plurality of card number storage tables, each table set corresponds to an expiration time, the expiration time corresponding to all card numbers in the table set is the same as the expiration time corresponding to the table set, and the card number information includes the card number and card number associated data; and after reaching an expiration time corresponding to a table set, performing a cleaning operation on all card number information in the table set. The provided method and device can increase (Continued)

cleaning and maintenance efficiency and reduce maintenance costs.

15 Claims, 4 Drawing Sheets

(51) Int. Cl.
*G06F 16/00* (2019.01)
*G06F 16/215* (2019.01)
*G06Q 20/10* (2012.01)
*G06F 16/245* (2019.01)
*G06F 16/22* (2019.01)
*G06F 16/23* (2019.01)

(52) U.S. Cl.
CPC ...... *G06F 16/2282* (2019.01); *G06F 16/2365* (2019.01); *G06F 16/245* (2019.01); *G06Q 20/108* (2013.01)

(56) References Cited

U.S. PATENT DOCUMENTS

| | | | |
|---|---|---|---|
| 2005/0252961 A1* | 11/2005 | Rasti | G06Q 20/385 235/380 |
| 2008/0313400 A1* | 12/2008 | Chang | G11C 16/349 711/115 |
| 2011/0213807 A1* | 9/2011 | Mattsson | G06F 16/90344 707/802 |
| 2012/0191927 A1* | 7/2012 | Gorobets | G06F 12/0246 711/156 |

* cited by examiner

| Card BIN | Service segment number | Intra-segment sequence numbe | Serial number | Parity bit |

After an expiration instance of time corresponding to a set of tables arrives, search a set of tables storage control table for a set of tables corresponding to the expiration instance of time, and clear the set of tables corresponding to the expiration instance of time — 401

Determine all the service segment numbers corresponding to the set of tables according to a mapping relationship between service segment numbers and a set of tables, and reclaim all the determined service segment numbers — 402

METHOD OF PROCESSING CARD NUMBER DATA AND DEVICE

CROSS-REFERENCE TO RELATED APPLICATIONS

This application is a National Stage of International Application No. PCT/CN2016/111143, filed Dec. 20, 2016, which claims the benefit of Chinese Patent Application No. 201511019374.9, filed with the Chinese Patent Office on Dec. 29, 2015, and entitled "An offline consumption method and apparatus", both of which are hereby incorporated by reference in their entireties.

FIELD

The present invention relates to the field of the Internet, and particularly to a method and apparatus for processing card number data.

BACKGROUND

Figure 1:
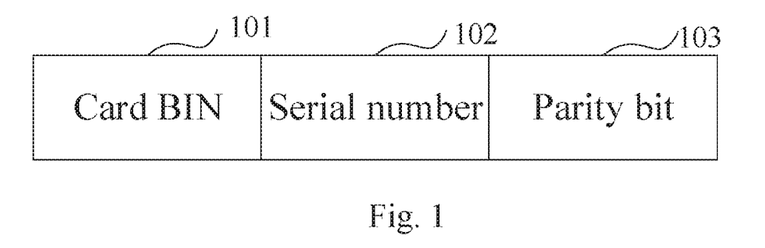
FIG. 1 is a schematic diagram of the components of the card number in the prior art.

In a financial transaction, the card number of a bank card includes three components of a card Bank Identification Number (BIN), a serial number, and a parity code. As illustrated in FIG. 1, the card BIN 101 is the identification number of the bank issuing the card, and primarily identifies a card issuing institution and a card type; the serial number 102 is a random digit sequence other than the card BIN and the parity bit, and primarily distinguishes different physical cards with the same card BIN, where each physical bank card corresponds to a unique serial number; and the parity bit 103 is primarily used to verify the card number for legality.

As there are increasingly widespread computers and network applications, and increasing varieties of service types in different fields, it is increasingly important to organize a database including a vast amount of card number data into tables, and to perform a query operation on the respective tables. At present, in order to improve the efficiency of storing, making a query among, and updating the card numbers in the case that there are a large amount of card number data, the card numbers and their related data are generally stored in tables in a chronological order of their serial numbers. However the card number data have to be transferred or cleared one by one at the end of their lifetime cycle, so that they may be cleared and maintained inefficiently and expensively.

In summary, the card number data may be cleared and maintained inefficiently and expensively in the existing method for processing card number data.

SUMMARY

Embodiments of the invention provide a method and apparatus for processing card number data so as to address the problem in the prior art card number data may be cleared and maintained inefficiently and expensively in the existing method for processing card number data.

An embodiment of the invention provides a method for processing card number data, the method including:

determining a set of tables corresponding to a card number according to an expiration instance of time corresponding to the card number, and placing card number information corresponding to the card number into at least one of card number storage tables in the set of tables, wherein the set of tables includes a plurality of card number storage tables, each set of tables corresponds to an expiration instance of time, all the card numbers in the set of tables correspond to the same expiration instance of times as the expiration instance of time corresponding to the set of tables, and the card number information includes the card number, and data associated with the card number; and clearing all the card number information in one of the sets of tables after the expiration instance of time corresponding to the set of tables arrives.

Optionally the card number includes a serial number allocated when the card number is generated; and after determining the set of tables corresponding to the card number according to the expiration instance of time corresponding to the card number, the method further includes:

determining the card number storage table corresponding to the card number in the set of tables according to the set of tables, and the serial number, and storing the card number information into the determined card number storage table.

Optionally before the determining the set of tables corresponding to the card number according to the expiration instance of time corresponding to the card number, the method further includes:

determining sets of tables corresponding to instance of time information according to a mapping relationship between instance of time information, and sets of tables, and storing the mapping relationship between instance of time information, and sets of tables, in a set of table storage control table, wherein the instance of time information includes a plurality of expiration instances of time, and each expiration instance of time corresponds to each of the sets of tables; and the clearing all the card number information in one of the sets of tables after the expiration instance of time corresponding to the set of tables arrives includes:

after the expiration instance of time corresponding to one of the sets of tables arrives, searching the set of tables storage control table for the set of tables corresponding to the expiration instance of time, and clearing the set of tables corresponding to the expiration instance of time.

Optionally the card number includes a service segment allocated according to service information when the card number is generated; and the clearing all the card number information in one of the sets of tables after the expiration instance of time corresponding to the set of tables arrives further includes:

after the expiration instance of time corresponding to one of the sets of tables arrives, determining the set of tables corresponding to the expiration instance of time;

determining all the service segment numbers corresponding to the set of tables according to a mapping relationship between service segment numbers and a set of tables; and reclaiming all the determined service segment numbers.

Optionally the method further includes:

determining a service segment number, and a serial number, corresponding to a card number to be queried;

determining a set of tables corresponding to the service segment number according to the mapping relationship between service segment numbers and a set of tables;

retrieving a card number storage table, in which the card number is stored, from the determined set of tables according to the serial number; and retrieving data associated with the card number from the determined card number storage table.

An embodiment of the invention provides an apparatus for processing card number data, the apparatus including:

a determining module configured to determine a set of tables corresponding to a card number according to an expiration instance of time corresponding to the card number, and to place card number information corresponding to the card number into at least one of card number storage tables in the set of tables, wherein the set of tables includes a plurality of card number storage tables, each set of tables corresponds to an expiration instance of time, all the card numbers in the set of tables correspond to the same expiration instance of times as the expiration instance of time corresponding to the set of tables, and the card number information includes the card number, and data associated with the card number; and a clearing module configured to clear all the card number information in one of the sets of tables after the expiration instance of time corresponding to the set of tables arrives.

Optionally the card number includes a serial number allocated when the card number is generated; and the determining module is further configured:

to determine the card number storage table, in the set of tables, corresponding to the card number according to the set of tables, and the serial number, and to store the card number information into the determined card number storage table.

Optionally the determining module is further configured:

to determine sets of tables corresponding to instance of time information according to a mapping relationship between instance of time information, and sets of tables, and to store the mapping relationship between instance of time information, and sets of tables, in a set of table storage control table, wherein the instance of time information includes a plurality of expiration instances of time, and each expiration instance of time corresponds to each of the sets of tables; and the determining module is configured to clear all the card number information in one of the sets of tables after the expiration instance of time corresponding to the set of tables arrives by:

after the expiration instance of time corresponding to one of the sets of tables arrives, searching the set of tables storage control table for the set of tables corresponding to the expiration instance of time, and clearing the set of tables corresponding to the expiration instance of time.

Optionally the card number includes a service segment allocated according to service information when the card number is generated; and the clearing module is further configured:

after the expiration instance of time corresponding to one of the sets of tables arrives, to determine the set of tables corresponding to the expiration instance of time; to determine all the service segment numbers corresponding to the set of tables according to a mapping relationship between service segment numbers and a set of tables; and to reclaim all the determined service segment numbers.

Optionally the determining module is further configured:

to determine a service segment number, and a serial number, corresponding to a card number to be queried; to determine a set of tables corresponding to the service segment number according to the mapping relationship between service segment numbers and a set of tables; to retrieve a card number storage table, in which the card number is stored, from the determined set of tables according to the serial number; and to retrieve data associated with the card number from the determined card number storage table.

An embodiment of the invention further provides an electronic device including: a transceiver, a processor, a memory, and a bus interface, wherein the transceiver, the processor, and the memory are connected via the bus interface; and the memory is configured to store one or more executable programs, and to store data for use by the processor in performing operations;

the processor is configured to read the executable programs in the memory, and to perform a method including: determining a set of tables corresponding to a card number according to an expiration instance of time corresponding to the card number, and placing card number information corresponding to the card number into at least one of card number storage tables in the set of tables, wherein the set of tables includes a plurality of card number storage tables, each set of tables corresponds to an expiration instance of time, all the card numbers in the set of tables correspond to the same expiration instance of times as the expiration instance of time corresponding to the set of tables, and the card number information includes the card number, and data associated with the card number; and clearing all the card number information in one of the sets of tables after the expiration instance of time corresponding to the set of tables arrives;

the transceiver is configured to transmit and receive data for use by the processor in performing the operations; and the bus interface is configured to provide an interface.

Optionally the card number includes a serial number allocated when the card number is generated; and the processor is further configured:

to determine the card number storage table corresponding to the card number in the set of tables according to the set of tables and the serial number, and to store the card number information into the determined card number storage table.

Optionally the processor is further configured:

to determine sets of tables corresponding to instance of time information according to a mapping relationship between instance of time information, and sets of tables, and to store the mapping relationship between instance of time information, and sets of tables, in a set of table storage control table, wherein the instance of time information includes a plurality of expiration instances of time, and each expiration instance of time corresponds to each of the sets of tables; and after the expiration instance of time corresponding to one of the sets of tables arrives, to search the set of tables storage control table for the set of tables corresponding to the expiration instance of time, and to clear the set of tables corresponding to the expiration instance of time.

Optionally the card number includes a service segment allocated according to service information when the card number is generated; and the processor is further configured:

after the expiration instance of time corresponding to one of the sets of tables arrives, to determine the set of tables corresponding to the expiration instance of time;

to determine all the service segment numbers corresponding to the set of tables according to a mapping relationship between service segment numbers and a set of tables; and to reclaim all the determined service segment numbers.

Optionally the processor is further configured:

to determine a service segment number, and a serial number, corresponding to a card number to be queried;

to determine a set of tables corresponding to the service segment number according to the mapping relationship between service segment numbers and a set of tables;

to retrieve a card number storage table, in which the card number is stored, from the determined set of tables according to the serial number; and to retrieve data associated with the card number from the determined card number storage table.

The embodiments of the invention provide a method and apparatus for processing card number data, where a set of tables corresponding to a card number is determined according to an expiration instance of time corresponding to the card number, and card number information corresponding to the card number is placed into at least one of card number storage tables in the set of tables, where the sets of tables includes a plurality of card number storage tables, each set of tables corresponds to an expiration instance of time, all the card numbers in the set of tables correspond to the same expiration instance of times as the expiration instance of time corresponding to the set of tables, and the card number information includes the card number, and data associated with the card number: and all the card number information in one of the set of tables is cleared after the expiration instance of time corresponding to the set of tables arrives. The method and apparatus for processing card number data according to the embodiments of the invention can clear all the card number information with the same expiration instance of time in a set of tables by categorizing and storing the card number information, to thereby improve the efficiency of clearing and maintaining card number data in the method for processing card number data, and lower the cost of maintaining the card number data.

BRIEF DESCRIPTION OF THE DRAWINGS

In order to make the technical solutions according to the embodiments of the invention more apparent, the drawings to which reference is made in the description of the embodiments will be described below briefly, and apparently the drawings to be described below are merely illustrative of some of the embodiments of the invention, and those ordinarily skilled in the art can further derive other drawings from these drawings without any inventive effort.

DETAILED DESCRIPTION OF THE EMBODIMENTS

In order to make the objects, technical solutions, and advantages of the invention more apparent, the technical solutions according to the embodiments of the invention will be described below in further details with reference to the drawings, and apparently the embodiments to be described are only a part but not all of the embodiments of the invention. Based upon the embodiments here of the invention, all the other embodiments which can occur to those ordinarily skilled in the art without any inventive effort shall fall into the scope of the invention.

Figure 2:
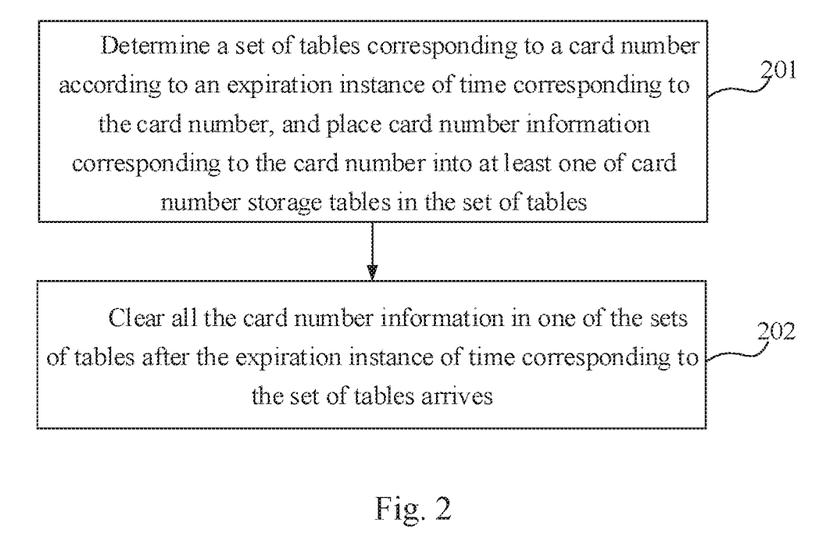
FIG. 2 is a schematic flow chart of a method for processing card number data according to an embodiment of the invention.

FIG. 2 illustrates a schematic flow chart of a method for processing card number data according to an embodiment of the invention, where the method includes following steps.

The step 201 is to determine a set of tables corresponding to a card number according to an expiration instance of time corresponding to the card number, and to place card number information corresponding to the card number into at least one of card number storage tables in the set of tables.

The step 202 is to clear all the card number information in one of the sets of tables after the expiration instance of time corresponding to the set of tables arrives.

Here the sets of tables includes a plurality of card number storage tables, each set of tables corresponds to an expiration instance of time, all the card numbers in the set of tables correspond to the same expiration instance of times as the expiration instance of time corresponding to the set of tables, and the card number information includes the card number, and data associated with the card number.

Particularly a system firstly determines sets of tables corresponding to instance of time information according to a mapping relationship between instance of time information and sets of tables, and stores the mapping relationship between instance of time information and sets of tables, in a set of table storage control table, where each set of table includes a plurality of card number storage tables, the instance of time information includes a plurality of expiration instances of time, and each expiration instance of time corresponds to each of the sets of tables. The expiration instance of time is counted in seconds, minutes, hours, days, weeks, months, years, etc., but the embodiment of the invention will not be limited thereto; and the expiration instance of time in the embodiment of the invention may be a point of time, or may be a period of time.

For example, the system creates sets of tables from Oct. 1, 2015 to Oct. 1, 2016, and an expiration instance of time is counted in days, that is, 365 sets of tables are created, the expiration instance of time of each set of tables corresponds to one of 365 days, and each set of tables can include a plurality of card number storage tables. For example, a set of tables with a corresponding expiration instance of time, Oct. 1, 2015 is G20151001, and if the set of tables, G20151001, includes 100 card number storage tables, then the card number storage tables in the set of tables, G20151001, may be assigned from G2015100100 to G2015100199, and a corresponding memory space from a system storage space may be allocated for each card number storage table.

It shall be noted that in the special case that there are a huge amount of data, there are data to be subdivided in a smaller unit of time, etc., different sets of tables may also correspond to the same expiration instance of time.

Particularly when there is a transaction taking place, an expiration instance of time corresponding to a card number input by a user is obtained, the set of tables storage control table is searched for a set of tables corresponding to the expiration instance of time, and card number information corresponding to the card number is placed into at least one of card number storage tables in the set of tables.

For example, the user binding his or her credit card with an online bank inputs an expiration date corresponding to the credit card, e.g., Oct. 1, 2015, and the system generates a card number under a preset rule, and searches the set of tables storage control table for a set of tables, G20151001, with an expiration instance of time, Oct. 1, 2015, and if the set of tables is found, then the system may store related data corresponding to the card number into one of card number storage tables in the set of tables G20151001.

After the expiration instance of time corresponding to one of the sets of tables arrives, the set of tables storage control table is searched for the set of tables corresponding to the expiration instance of time, and the set of tables corresponding to the expiration instance of time is cleared. For example, when the expiration instance of time, Oct. 1, 2015, arrives, the set of tables G20151001 is cleared, that is, card numbers, and data associated with the card numbers, in all the card number storage tables in the set of tables are cleared.

Figure 3:
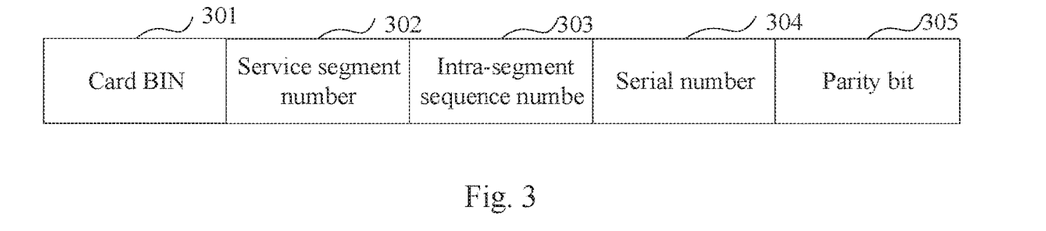
FIG. 3 is a schematic diagram of components of a card number according to an embodiment of the invention.

Furthermore a card number includes a string of digits, and FIG. 3 is a schematic diagram of components of a card number according to an embodiment of the invention. As illustrated in FIG. 3, the card number includes five components of a card BIN 301, a service segment number 302, an intra-segment sequence number 303, a serial number 304, and a parity bit 305.

The card BIN 301 is an identification number of a card issuing bank, and primarily identifies the card issuing institution and a card type. The card BIN 301 includes six digits, where the BIN starting with the digit "4" belongs to the VISA card organization, the BIN starting with the digit "5" belongs to the MasterCard card organization, and the BIN starting with the digit "9", "62", or "60" belongs to the China Union Pay. For example, a card with a card BIN 622575 is a credit card issued by the China Merchants Bank.

In an embodiment of the invention, a service number includes the service segment number 302 and the intra-segment sequence number 303. The service segment number 302 is generated from service information, and the service segment number 302 can include 2 to 6 digits. For example, cards are categorized into general, VIP, and credit cards according to service information, so the service segment number 302 of a general card can be set to 1000, the service segment number of a VIP card can be set to 1001, and the service segment number of a credit card can be set to 1002.

The same service is categorized using the intra-segment sequence number 303 according to its expiration instance of time as the service is evolving, and the intra-segment sequence number 303 can include 2 to 4 digits. For example, if the intra-segment sequence number 303 corresponding to the expiration instance of time, Oct. 1, 2015, is 01, and the intra-segment sequence number 303 corresponding to the expiration instance of time, Oct. 2, 2015, is 02, then a service number of a VIP card with an expiration instance of time, Oct. 1, 2015, will be 100101, and a service number of a normal card with an expiration instance of time, Oct. 2, 2015, will be 100002.

It shall be noted that the service segment number and the intra-segment sequence number can be changed as the service is evolving. For example, the two-digit e intra-segment sequence number fails to satisfy a demand of a service, so the e intra-segment sequence number can be extended to 3 digits. Furthermore when a card number is generated, a mapping relationship between service segment numbers and a set of tables also needs to be stored for query, update, and clear operations on card number information. When the card number is generated, the service segment number at a higher priority in the same service number can be preferentially generated.

The serial number 304 is a random digit sequence, and the serial number 304 can include 3 to 6 digits, and be assigned automatically by a card number allocation system to primarily distinguish different physical card numbers with the same card BIN from each other; and furthermore the number of a corresponding card number storage table in which a card number is stored can be determined according to the rule of setting the serial number 304 (e.g., the time when the serial number 304 is allocated).

The parity bit 305 is primarily used to verify the card number for legality, and the parity bit, which is one bit, can be calculated from the digits preceding thereto, in the Luhn algorithm.

In the step 201, the sets of tables corresponding to the card number are determined according to the expiration instance of time corresponding to the card number, the card number storage table in the sets of tables corresponding to the card number is further determined according to the sets of tables, and the serial number, and the card number information is stored in the determined card number storage table. For example, a set of tables corresponding to a card number with an expiration instance of time, Oct. 1, 2015, is G20151001, a serial number allocated when the card number is generated is 200102, and a first card number storage table, corresponding to the card number, in the set of tables, G20151001, is determined according to the time when the serial number 200102 allocated, so the card number information is stored in the set of tables, G2015100100.

In the step 202, after the expiration instance of time corresponding to one of the sets of tables arrives, the set of tables corresponding to the expiration instance of time is determined; all the service segment numbers corresponding to the set of tables are determined according to the mapping relationship between service segment numbers and a set of tables; and all the determined service segment numbers are reclaimed.

For example, a card number A represents a VIP personal card with a service segment number 1001, and a card number B represents a general commercial card with a service segment number 1000. If both of expiration instance of times corresponding to the card A and the card B are Oct. 1, 2010, then the service segment number 1001 and the service segment number 1000 will be cleared while the set of tables, G20151001, according to the mapping relationship between service segment numbers and a set of tables. A memory space of card number storage tables in the cleared set of tables can be freed up for storage of newly generated card number data, and the cleared service segment numbers can be recycled for allocation of service segment numbers of newly generated cards.

Furthermore, in an embodiment of the invention, query and modify operations are performed on a card number by firstly determining a service segment number, and a serial number, corresponding to the card number to be queried; determining a set of tables corresponding to the service segment number according to the mapping relationship between service segment numbers and a set of tables; retrieving a card number storage table, in which the card number is stored, from the determined set of tables according to the serial number; and retrieving data associated with the card number from the determined card number storage table.

For example, a query is made on the card number A by firstly determining a service segment number, and a serial number, in the card number, where the service segment number is 1001, and the serial number is 200102. Then the set of tables, G20151001, corresponding to the card number A is determined according to the mapping relationship between the service segment number 1001 and the set of tables, and next the card number storage table G2015100100 corresponding to the card number A is determined according to the serial number 200102. Finally the card number storage table G2015100100 is searched for data associated with the card number A, e.g., an account balance, etc.

In the method for processing card number data according to the embodiment of the invention, a set of tables corresponding to a card number is determined according to an expiration instance of time corresponding to the card number, and card number information corresponding to the card number is placed into at least one of card number storage tables in the set of tables, where the set of tables includes a plurality of card number storage tables, each set of tables corresponds to an expiration instance of time, all the card numbers in the set of tables correspond to the same expiration instance of times as the expiration instance of time corresponding to the set of tables, and the card number information includes the card number, and data associated with the card number; and all the card number information in one of the sets of tables is cleared after the expiration instance of time corresponding to the set of tables arrives. The method for processing card number data according to the embodiment of the invention can improve the efficiency of clearing and maintaining card number data in the method for processing card number data, and lower the cost of maintaining the card number data.

Figure 4:
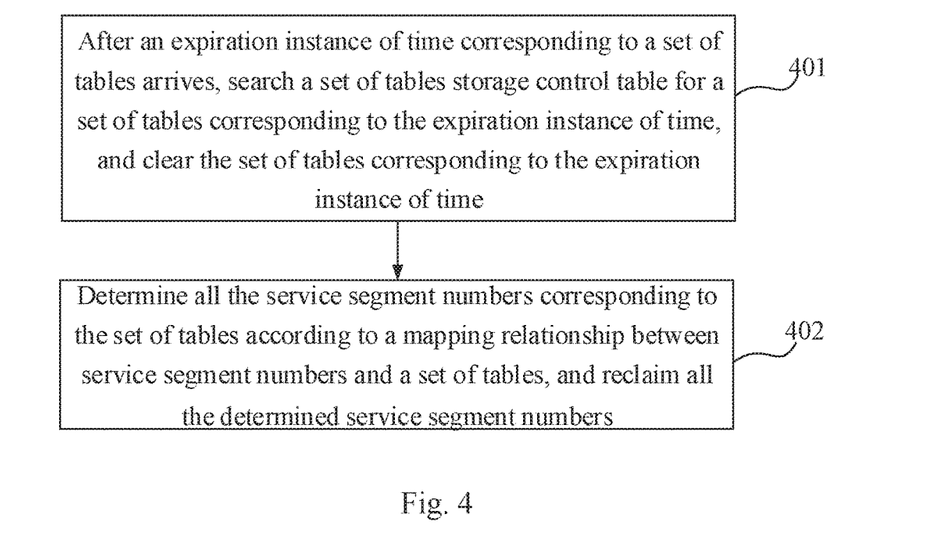
FIG. 4 is a flow chart of a method for clearing card number data according to an embodiment of the invention.

The method for processing card number data according to the embodiment of the invention will be described below in details in connection with a process of clearing card number data. FIG. 4 is a flow chart of a method for clearing card number data according to an embodiment of the invention, and as illustrated in FIG. 4, the method includes following steps.

The step 401 is, after an expiration instance of time corresponding to a set of tables arrives, to search a set of tables storage control table for a set of tables corresponding to the expiration instance of time, and to clear the set of tables corresponding to the expiration instance of time.

For example, when the expiration instance of time, Oct. 1, 2015, arrives, the set of tables, G20151001, is cleared, that is, card numbers, and data associated with the card numbers, in all the card number storage tables in the set of tables are cleared.

The step 402 is to determine all the service segment numbers corresponding to the set of tables according to a mapping relationship between service segment numbers and a set of tables; and to reclaim all the determined service segment numbers.

For example, the card number A represents a VIP personal card with a service segment number 1001, and the card number B represents a general commercial card with a service segment number 1000. If both of expiration instance of times corresponding to the card A and the card B are Oct. 1, 2010, then the service segment number 1001 and the service segment number 1000 will be cleared while the set of tables, G20151001, according to the mapping relationship between service segment numbers and a set of tables. A memory space of card number storage tables in the cleared set of tables can be freed up for storage of newly generated card number data, and the cleared service segment numbers can be recycled for allocation of service segment numbers of newly generated cards.

Figure 5:
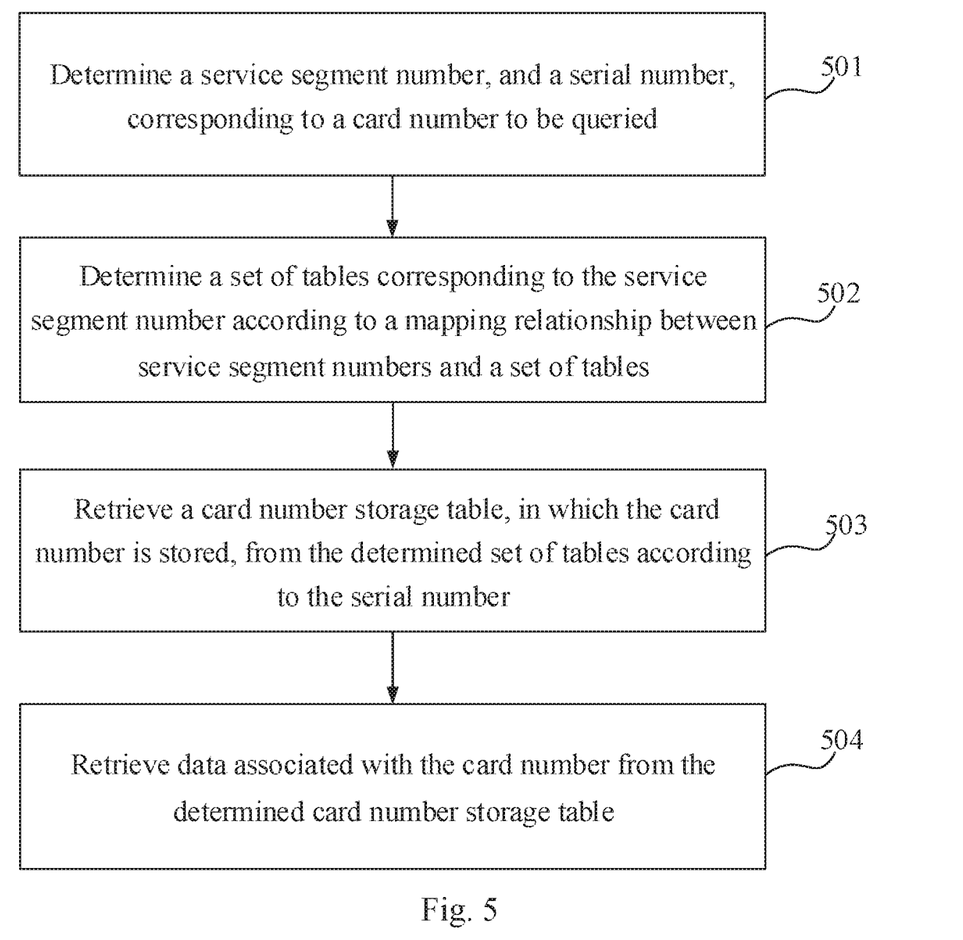
FIG. 5 is a flow chart of a method for making a query about and updating card number data according to an embodiment of the invention.

The method for processing card number data according to the embodiment of the invention will be described below in details in connection with a process of making a query on and updating card number data. FIG. 5 is a flow chart of a method for query on and updating card number data according to an embodiment of the invention, and as illustrated in FIG. 5, the method includes following steps.

The step 501 is to determine a service segment number, and a serial number, corresponding to a card number to be queried.

The step 502 is to determine a set of tables corresponding to the service segment number according to a mapping relationship between service segment numbers and a set of tables.

The step 503 is to retrieve a card number storage table, in which the card number is stored, from the determined set of tables according to the serial number.

The step 504 is to retrieve data associated with the card number from the determined card number storage table.

For example, a query is made on the card number A by firstly determining a service segment number, and a serial number, in the card number, where the service segment number is 1001, and the serial number is 200102. Then the set of tables, G20151001, corresponding to the card number A is determined according to the mapping relationship between the service segment number 1001 and the set of tables, and next the card number storage table G2015100100 corresponding to the card number A is determined according to the serial number 200102. Finally the card number storage table G2015100100 is searched for data associated with the card number A, e.g., an account balance, etc.

Figure 6:
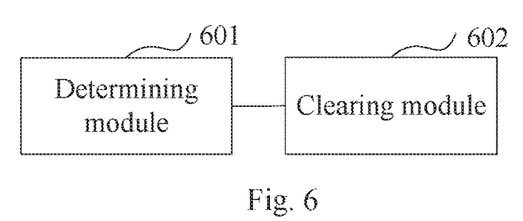
FIG. 6 is a schematic structural diagram of an apparatus for processing card number data according to an embodiment of the invention.

Based upon the same inventive idea, an embodiment of the invention further provides an apparatus for processing card number data, and as illustrated in FIG. 6 which is a schematic structural diagram of a an apparatus for processing card number data according to an embodiment of the invention, the apparatus includes followings.

A determining module 601 is configured to determine a set of tables corresponding to a card number according to an expiration instance of time corresponding to the card number, and to place card number information corresponding to the card number into at least one of card number storage tables in the set of tables, where the set of tables includes a plurality of card number storage tables, each set of tables corresponds to an expiration instance of time, all the card numbers in the set of tables correspond to the same expiration instance of times as the expiration instance of time corresponding to the set of tables, and the card number information includes the card number, and data associated with the card number.

A clearing module 602 is configured to clear all the card number information in one of the sets of tables after the expiration instance of time corresponding to the set of tables arrives.

Optionally the card number includes a serial number allocated when the card number is generated.

The determining module 601 is further configured to determine the card number storage table, in the set of tables, corresponding to the card number according to the set of tables, and the serial number, and to store the card number information into the determined card number storage table.

Optionally the determining module 601 is further configured to determine sets of tables corresponding to instance of time information according to a mapping relationship between instance of time information, and sets of tables, and to store the mapping relationship between instance of time information, and sets of tables, in a set of table storage control table, where the instance of time information includes a plurality of expiration instances of time, and each expiration instance of time corresponds to each of the sets of tables.

The operation of clearing all the card number information in one of the sets of tables after the expiration instance of time corresponding to the set of tables arrives includes: after the expiration instance of time corresponding to one of the sets of tables arrives, to search the set of tables storage control table for the set of tables corresponding to the expiration instance of time, and to clear the set of tables corresponding to the expiration instance of time.

Optionally the card number includes a service segment allocated according to service information when the card number is generated.

The clearing module 602 is further configured: after the expiration instance of time corresponding to one of the sets of tables arrives, to determine the set of tables corresponding to the expiration instance of time; to determine all the service segment numbers corresponding to the set of tables according to a mapping relationship between service segment numbers and a set of tables; and to reclaim all the determined service segment numbers.

Optionally the determining module 601 is further configured to determine a service segment number, and a serial number, corresponding to a card number to be queried; to determine a set of tables corresponding to the service segment number according to the mapping relationship between service segment numbers and a set of tables; to retrieve a card number storage table, in which the card number is stored, from the determined set of tables according to the serial number; and to retrieve data associated with the card number from the determined card number storage table.

In the apparatus for processing card number data according to the embodiment of the invention, a set of tables corresponding to a card number is determined according to an expiration instance of time corresponding to the card number, and card number information corresponding to the card number is placed into at least one of card number storage tables in the set of tables, where the sets of tables includes a plurality of card number storage tables, each set of tables corresponds to an expiration instance of time, all the card numbers in the set of tables correspond to the same expiration instance of times as the expiration instance of time corresponding to the set of tables, and the card number information includes the card number, and data associated with the card number; and all the card number information in one of the set of tables is cleared after the expiration instance of time corresponding to the set of tables arrives. The apparatus for processing card number data according to the embodiment of the invention can improve the efficiency of clearing and maintaining card number data in the method for processing card number data, and lower the cost of maintaining the card number data.

Figure 7:
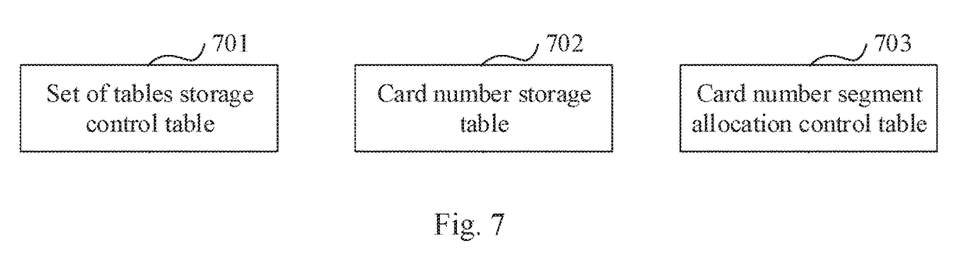
FIG. 7 is a structural diagram of an apparatus for processing card number data according to an embodiment of the invention.

The apparatus for processing card number data according to the embodiment of the invention will be described below in details in connection with a particular application scenario thereof. As illustrated in FIG. 7 which is a schematic diagram of an apparatus for processing card number data according to an embodiment of the invention, the apparatus includes a set of tables storage control table 701, a card number storage table 702, and a card number segment allocation control table 703.

Particularly a system firstly determines sets of tables corresponding to instance of time information according to a mapping relationship between instance of time information, and sets of tables, and stores the mapping relationship between instance of time information, and sets of tables, in the set of table storage control table 701, where the instance of time information includes a plurality of expiration instances of time, and each expiration instance of time corresponds to each of the sets of tables. The expiration instance of time is counted in seconds, minutes, hours, days, weeks, months, years, etc. Here each set of tables includes at least one card number storage table 702, and each card number storage table 702 is allocated with a corresponding memory space for storage of card number information.

For example, a set of tables with a corresponding expiration instance of time, Oct. 1, 2015 is determined as G20151001 according to the set of table storage control table 701, and if the set of tables, G20151001, includes 100 card number storage tables 702, then the card number storage tables 702 in the set of tables, G20151001 may be assigned from G2015100100 to G2015100199, and a corresponding memory space from a system storage space may be allocated for each card number storage table 702.

When there is a transaction taking place, an expiration instance of time corresponding to a card number input by a user is obtained, the set of tables storage control table 701 is searched for a set of tables corresponding to the expiration instance of time corresponding to the card number according to the expiration instance of time, and card number information corresponding to the card number is placed into one of the card number storage tables 702 in the set of tables.

For example, when the user binds his or her credit card with an online bank, the user inputs an expiration date corresponding to the credit card, e.g., Oct. 1, 2015, and the system generates a card number under a preset rule, and searches the set of tables storage control table 701 for a set of tables, G20151001, with an expiration instance of time, Oct. 1, 2015, and if the set of tables is found, then the system may store related data corresponding to the card number into one of the card number storage tables 702 in the set of tables G20151001.

After the expiration instance of time corresponding to one of the sets of tables arrives, the set of tables storage control table is searched for the set of tables corresponding to the expiration instance of time, and the set of tables corresponding to the expiration instance of time is cleared. For example, when the expiration instance of time, Oct. 1, 2015, arrives, the set of tables G20151001 is cleared, that is, card numbers, and data associated with the card numbers, in all the card number storage tables in the set of tables are cleared.

The card number segment allocation control table 703 stores the allocation of card BINs and service segment numbers, and the mapping relationship between service segment numbers and a set of table. Query and modify operations are performed on a card number by firstly determining a service segment number, and a serial number, corresponding to the card number to be queried; determining a set of tables corresponding to the service segment number according to the mapping relationship between service segment numbers and a set of tables, in the card number segment allocation control table 703; retrieving one of the card number storage tables 702, in which the card number is stored, from the determined set of tables according to the serial number; and retrieving data associated with the card number from the card number storage table 702.

For example, a query is made on a card number A by firstly determining a service segment number, and a serial number, in the card number, where the service segment number is 1001, and the serial number is 200102. The set of tables, G20151001, corresponding to the card number A is determined according to the mapping relationship between the service segment number 1001 and the set of tables, in the card number segment allocation control table 703, and then the card number storage table 702, G2015100100, corresponding to the card number A is determined according to the serial number 200102. The card number storage table 702, G2015100100, is searched for data associated with the card number A, e.g., an account balance, etc.

Figure 8:
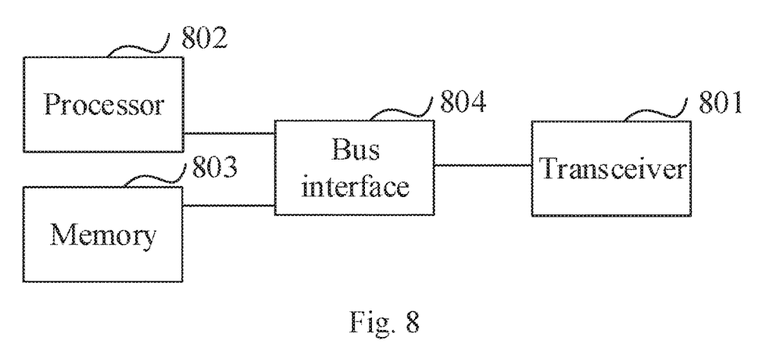
FIG. 8 is a schematic structural diagram of an electronic device according to an embodiment of the invention.

Based upon the same inventive idea, an embodiment of the invention further provides an electronic device as illustrated in FIG. 8, which includes a transceiver 801, a processor 802, a memory 803, and a bus interface 804, where the transceiver 801, the processor 802, and the memory 803 are connected via the bus interface 804.

The memory 803 is configured to store one or more executable programs, and it can store data for use by the processor 802 in performing operations, and can particularly store card number information, sets of tables corresponding to card numbers, card number storage tables, and other information.

The processor 802 is configured to read the program(s) in the memory, and to perform a method including: determining a set of tables corresponding to a card number according to an expiration instance of time corresponding to the card number, and placing card number information corresponding to the card number into at least one of card number storage tables in the set of tables, where the set of tables includes a plurality of card number storage tables, each set of tables corresponds to an expiration instance of time, all the card numbers in the set of tables correspond to the same expiration instance of times as the expiration instance of time corresponding to the set of tables, and the card number information includes the card number, and data associated with the card number; and clearing all the card number information in one of the sets of tables after the expiration instance of time corresponding to the set of tables arrives.

The transceiver 801 is configured to transmit and receive data for use by the processor 802 in performing the operations.

The bus interface 804 is configured to provide an interface.

Optionally the card number includes a serial number allocated when the card number is generated.

The processor 802 is further configured to determine the card number storage table, in the set of tables, corresponding to the card number according to the set of tables, and the serial number, and to store the card number information into the determined card number storage table.

Optionally the processor 802 is further configured: to determine sets of tables corresponding to instance of time information according to a mapping relationship between instance of time information, and sets of tables, and to store the mapping relationship between instance of time information, and sets of tables, in a set of table storage control table, where the instance of time information includes a plurality of expiration instances of time, and each expiration instance of time corresponds to each of the sets of tables.

After the expiration instance of time corresponding to one of the sets of tables arrives, to search the set of tables storage control table for the set of tables corresponding to the expiration instance of time, and to clear the set of tables corresponding to the expiration instance of time.

Optionally the card number includes a service segment allocated according to service information when the card number is generated.

The processor 802 is further configured: after the expiration instance of time corresponding to one of the sets of tables arrives, to determine the set of tables corresponding to the expiration instance of time; to determine all the service segment numbers corresponding to the set of tables according to a mapping relationship between service segment numbers and a set of tables; and to reclaim all the determined service segment numbers.

Optionally the processor 802 is further configured: to determine a service segment number, and a serial number, corresponding to a card number to be queried; to determine a set of tables corresponding to the service segment number according to the mapping relationship between service segment numbers and a set of tables; to retrieve a card number storage table, in which the card number is stored, from the determined set of tables according to the serial number; and to retrieve data associated with the card number from the determined card number storage table.

In the electronic device according to the embodiment of the invention, a set of tables corresponding to a card number is determined according to an expiration instance of time corresponding to the card number, and card number information corresponding to the card number is placed into at least one of card number storage tables in the set of tables, where the sets of tables includes a plurality of card number storage tables, each set of tables corresponds to an expiration instance of time, all the card numbers in the set of tables correspond to the same expiration instance of times as the expiration instance of time corresponding to the set of tables, and the card number information includes the card number, and data associated with the card number; and all the card number information in one of the set of tables is cleared after the expiration instance of time corresponding to the set of tables arrives. The electronic device according to the embodiment of the invention can improve the efficiency of clearing and maintaining card number data in the method for processing card number data, and lower the cost of maintaining the card number data.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for processing card number data, the method comprising:
   determining a set of tables from a database corresponding to a card number, wherein:
      the database stores multiple set of tables,
      the set of tables is determined based on an expiration time of the card number, and
      each of the multiple sets of tables corresponds to an expiration time,
   placing card number information corresponding to the card number into at least one card number storage table in the determined set of tables, wherein:
      the set of tables comprises a plurality of card number storage tables,
      all card numbers in the set of tables have a same expiration time as an expiration time corresponding to the set of tables, and
      the card number information comprises the card number and data associated with the card number; and
   clearing all the card number information in the set of tables after the expiration time corresponding to the set of tables arrives.

2. The method according to claim 1, wherein the card number comprises a serial number allocated when the card number is generated; and
   after determining the set of tables corresponding to the card number based on the expiration time of the card number, the method further comprises:
      determining the card number storage table corresponding to the card number in the set of tables, according to the set of tables and the serial number, and
      storing the card number information into the determined card number storage table.

3. The method according to claim 2, wherein before the determining the set of tables corresponding to the card number according to the expiration time of the card number, the method further comprises:
   determining sets of tables corresponding to time information according to a mapping relationship between time information and sets of tables, and storing the mapping relationship between time information and sets of tables in a set of table storage control table, wherein the time information comprises a plurality of expiration instances of time, and each expiration time corresponds to each of the sets of tables; and
   the clearing all the card number information in one of the sets of tables after the expiration time corresponding to the set of tables arrives, comprises:
      after the expiration time corresponding to one of the sets of tables arrives, searching the set of tables storage control table for the set of tables corresponding to the expiration time, and clearing the set of tables corresponding to the expiration time.

4. The method according to claim 2, wherein the card number comprises a service segment allocated according to service information when the card number is generated; and
   the clearing all the card number information in one of the sets of tables after the expiration time corresponding to the set of tables arrives further comprises:
      after the expiration time corresponding to one of the sets of tables arrives, determining the set of tables corresponding to the expiration time;
      determining all the service segment numbers corresponding to the set of tables according to a mapping relationship between service segment numbers and a set of tables; and
      reclaiming all the determined service segment numbers.

5. The method according to claim 4, wherein the method further comprises:
   determining a service segment number and a serial number, corresponding to a card number to be queried;
   determining a set of tables corresponding to the service segment number according to the mapping relationship between service segment numbers and a set of tables;
   retrieving a card number storage table, in which the card number is stored, from the determined set of tables according to the serial number; and
   retrieving data associated with the card number from the determined card number storage table.

6. An apparatus for processing card number data, the apparatus comprising:
   a processor configured to:
      determine a set of tables from a database corresponding to a card number, wherein:
         the database stores multiple sets of tables,
         the set of tables is determined based on an expiration time of the card number, and
         each of the multiple sets of tables correspond to an expiration time
      place card number information corresponding to the card number into at least one card number storage table in the determined set of tables, wherein:
         the set of tables comprises a plurality of card number storage tables,
         all card numbers in the set of tables have a same expiration time as an expiration corresponding to the set of tables, and
         the card number information comprises the card number, and data associated with the card number; and
      clear all the card number information in one of the sets of tables after the expiration time corresponding to the set of tables arrives.

7. The apparatus according to claim 6, wherein:
   the card number comprises a serial number allocated when the card number is generated; and
   the processor is further configured to determine the card number storage table corresponding to the card number in the set of tables according to the set of tables, and the serial number, and to store the card number information into the determined card number storage table.

8. The apparatus according to claim 7, wherein the processor is further configured:
   to determine sets of tables corresponding to time information according to a mapping relationship between time information and sets of tables, and to store the mapping relationship between time information, and sets of tables, in a set of table storage control table, wherein the time information comprises a plurality of expiration instances of time, and each expiration time corresponds to each of the sets of tables; and the processor is configured to clear all the card number information in one of the sets of tables after the expiration time corresponding to the set of tables arrives by:

after the expiration time corresponding to one of the sets of tables arrives, searching the set of tables storage control table for the set of tables corresponding to the expiration time, and clearing the set of tables corresponding to the expiration time.

9. The apparatus according to claim 7, wherein the card number comprises a service segment allocated according to service information when the card number is generated; and the processor is further configured: to, after the expiration time corresponding to one of the sets of tables arrives, determine the set of tables corresponding to the expiration time; to determine all the service segment numbers corresponding to the set of tables according to a mapping relationship between service segment numbers and a set of tables; and to reclaim all the determined service segment numbers.

10. The apparatus according to claim 9, wherein the processor is further configured:

to determine a service segment number, and a serial number, corresponding to a card number to be queried; to determine a set of tables corresponding to the service segment number according to the mapping relationship between service segment numbers and a set of tables; to retrieve a card number storage table, in which the card number is stored, from the determined set of tables according to the serial number; and to retrieve data associated with the card number from the determined card number storage table.

11. An electronic device, comprising: a transceiver, a processor, a memory, and a bus interface, wherein the transceiver, the processor, and the memory are connected via the bus interface; and the memory is configured to store one or more executable programs, and to store data for use by the processor in performing operations;

the processor is configured to read the executable programs in the memory, and to perform a method comprising:

determining a set of tables from a database corresponding to a card number, wherein:
the database stores multiple set of tables,
the set of tables is determined based on an expiration time of the card number, and
each of the multiple sets of tables corresponds to an expiration time, placing card number information corresponding to the card number into at least one card number storage tables in the determined set of tables, wherein:
the set of tables comprises a plurality of card number storage tables,
all card numbers in the set of tables have a same expiration time as an expiration time corresponding to the set of tables, and
the card number information comprises the card number, and data associated with the card number; and clearing all the card number information in the set of tables after the expiration time corresponding to the set of tables arrives;

the transceiver is configured to transmit and receive data used by the processor in performing the operations; and the bus interface is configured to provide an interface.

12. The electronic device according to claim 11, wherein the card number comprises a serial number allocated when the card number is generated; and the processor is further configured:
to determine the card number storage table corresponding to the card number in the set of tables according to the set of tables and the serial number, and to store the card number information into the determined card number storage table.

13. The electronic device according to claim 12, wherein the processor is further configured:

to determine sets of tables corresponding to time information according to a mapping relationship between time information, and sets of tables, and to store the mapping relationship between time information, and sets of tables, in a set of table storage control table, wherein the time information comprises a plurality of expiration instances of time, and each expiration time corresponds to each of the sets of tables; and after the expiration time corresponding to one of the sets of tables arrives, to search the set of tables storage control table for the set of tables corresponding to the expiration time, and to clear the set of tables corresponding to the expiration time.

14. The electronic device according to claim 12, wherein the card number comprises a service segment allocated according to service information when the card number is generated; and the processor is further configured:
after the expiration time corresponding to one of the sets of tables arrives, to determine the set of tables corresponding to the expiration time;
to determine all the service segment numbers corresponding to the set of tables according to a mapping relationship between service segment numbers and a set of tables; and
to reclaim all the determined service segment numbers.

15. The electronic device according to claim 14, wherein the processor is further configured:

to determine a service segment number, and a serial number, corresponding to a card number to be queried;
to determine a set of tables corresponding to the service segment number according to the mapping relationship between service segment numbers and a set of tables;
to retrieve a card number storage table, in which the card number is stored, from the determined set of tables according to the serial number; and
to retrieve data associated with the card number from the determined card number storage table.

* * * * *